United States Patent
Ding et al.

(10) Patent No.: US 11,629,967 B2
(45) Date of Patent: Apr. 18, 2023

(54) ROUTE PLANNING METHOD, DEVICE AND COMPUTER STORAGE MEDIUM

(71) Applicant: Baidu Online Network Technology (Beijing) Co., Ltd, Beijing (CN)

(72) Inventors: Shiqiang Ding, Beijing (CN); Chongli Zhu, Beijing (CN); Chengzhou Li, Beijing (CN); Jizhou Huang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 46 days.

(21) Appl. No.: 16/942,502

(22) Filed: Jul. 29, 2020

(65) Prior Publication Data

US 2021/0102818 A1    Apr. 8, 2021

(30) Foreign Application Priority Data

Oct. 8, 2019    (CN) .......................... 201910948522.7

(51) Int. Cl.
*G01C 21/34*    (2006.01)
*G01C 21/36*    (2006.01)

(52) U.S. Cl.
CPC ..... *G01C 21/3461* (2013.01); *G01C 21/3676* (2013.01)

(58) Field of Classification Search
CPC ...... G07C 27/26; G08G 1/0969; G01C 21/32; G01C 27/06; G01C 27/34; G01C 21/3461; G01C 21/3484; G01C 21/20; G01C 21/3664; G01C 21/00; G01C 21/3423; G01C 21/3676; G09B 29/106
See application file for complete search history.

(56) References Cited

U.S. PATENT DOCUMENTS

| | | | |
|---|---|---|---|
| 2012/0101717 A1* | 4/2012 | Zhang | G01C 21/20 701/409 |
| 2018/0080786 A1 | 3/2018 | McBride et al. | |
| 2019/0004525 A1* | 1/2019 | Bills | G05D 1/0278 |

(Continued)

FOREIGN PATENT DOCUMENTS

| | | |
|---|---|---|
| CN | 1576792 A | 2/2005 |
| CN | 1786667 A | 6/2006 |
| CN | 102519452 A | 6/2012 |

(Continued)

OTHER PUBLICATIONS

Search Report in Chinese Application No. 201910948522.7, dated Mar. 25, 2020, with English translation provided by Google Translate.

(Continued)

*Primary Examiner* — Jess Whittington
*Assistant Examiner* — Terry C Buse
(74) *Attorney, Agent, or Firm* — Ladas & Parry, LLP

(57) ABSTRACT

A route planning method includes: receiving a route planning request including information of a starting position and information of a destination position; planning a route from the starting position to the destination position based on conditions about a road including a physical isolation belt; sending a route planning result, the conditions about a road including a physical isolation belt are fused into the route planning.

11 Claims, 5 Drawing Sheets

(56) References Cited

U.S. PATENT DOCUMENTS

2019/0195638 A1* 6/2019 Tajammul .............. G01C 21/34
2020/0167575 A1* 5/2020 Nayak .................. G06V 10/454

FOREIGN PATENT DOCUMENTS

| CN | 205874864 | * | 6/2016 | ............... E01C 1/02 |
| CN | 107403240 | A | 11/2017 | |
| CN | 110164162 | A | 8/2019 | |

OTHER PUBLICATIONS

First Office Action in Chinese Application 201910948522.7, dated Apr. 1, 2020.
Second Office Action In Chinese Application No. 201910948522.7, dated Jul. 1, 2020.
Supplementary Search Report in Chinese Application No. 201910948522.7, dated Jun. 26, 2020.

* cited by examiner

ROUTE PLANNING METHOD, DEVICE AND COMPUTER STORAGE MEDIUM

CROSS REFERENCE TO RELATED APPLICATIONS

The present application claims the priority of Chinese Patent Application No. 201910948522.7, filed on Oct. 8, 2019. The disclosure of the above application is incorporated herein by reference in its entirety.

TECHNICAL FIELD

The present disclosure relates to a technical field of computer applications, particularly to a route planning method, apparatus, device and computer storage medium in the field of big data.

BACKGROUND

As computer application technologies develop rapidly, users increasingly use navigation to provide guidance during travel. However, currently, the route planning used by the navigation is usually based on factors such as a route length and a road level, but seldom considers the safety factor of the route.

SUMMARY

In view of the above, the present disclosure provides a route planning method, apparatus, device and computer storage medium, to facilitate improving safety of the planned route.

In a first aspect, the present disclosure provides a route planning method which includes:

receiving a route planning request including information of a starting position and information of a destination position;

planning a route from the starting position to the destination position based on conditions about a road including a physical isolation belt;

sending a route planning result.

According to an embodiment of the present disclosure, the method may further include:

judging whether the route planning request includes instruction information of considering a safety factor;

planning the route from the starting position to the destination position based on whether a road includes a physical isolation belt in response to determining that the route planning request includes the instruction information of considering the safety factor.

According to an embodiment of the present disclosure, the method may further include:

judging whether a type of the route planning request is a riding route planning;

planning the route from the starting position to the destination position based on whether a road includes a physical isolation belt in response to determining that the type of the route planning request is the riding route planning.

According to an embodiment of the present disclosure, the planning a route from the starting position to the destination position based on conditions about a road including a physical isolation belt comprises:

selecting preferably a road including a physical isolation belt if there are a plurality of optional roads during the route planning.

According to an embodiment of the present disclosure, the planning a route from the starting position to the destination position based on conditions about a road including a physical isolation belt may includes:

obtaining initial planning results from the starting position to the destination position;

sorting the initial planning results based on the conditions about a road including a physical isolation belt in routes of the initial planning results;

determining the route planning result according to a sorting result.

According to an embodiment of the present disclosure, the conditions about a road including a physical isolation belt in the routes comprise:

the number of roads including physical isolation belts in the routes, or a total length of a road including a physical isolation belt in the routes.

According to an embodiment of the present disclosure, the method may further include:

indicating, in the route planning result, the road including the physical isolation belt in the route.

In a second aspect, the present disclosure provides a route planning method, which includes:

sending a route planning request to a server side, the request including information of a starting position and information of a destination position;

receiving a route planning result returned by the server side, the route planning result being a route from the starting position to the destination position planned by the server side based on conditions about a road including a physical isolation belt;

displaying the route planning result.

According to an embodiment of the present disclosure, the route planning request may include instruction information of considering a safety factor, or a type of the route planning request is a riding route planning.

According to an embodiment of the present disclosure, the displaying the route planning result may include:

displaying the planned route, and indicating the road including the physical isolation belt in the route.

In a third aspect, the present disclosure provides a route planning apparatus, which includes:

a receiving unit configured to receive a route planning request including information of a starting position and information of a destination position;

a planning unit configured to plan a route from the starting position to the destination position based on conditions about a road including a physical isolation belt;

a sending unit configured to send a route planning result.

According to an embodiment of the present disclosure, the apparatus may further include:

a first judging unit configured to judge whether the route planning request includes instruction information of considering a safety factor, and instruct the planning unit to plan the route from the starting position to the destination position based on whether the road includes the physical isolation belt in response to determining that the route planning request includes the instruction information of considering the safety factor.

According to an embodiment of the present disclosure, the apparatus may further include:

a second judging unit configured to judge whether a type of the route planning request is a riding route planning, and instruct the planning unit to plan the route from the starting position to the destination position based on whether a road includes a physical isolation belt in response to determining that the type of the route planning request is the riding route planning.

According to an embodiment of the present disclosure, the planning unit is specifically configured to select preferably a road including a physical isolation belt if there are a plurality of optional roads during the route planning.

According to an embodiment of the present disclosure, the planning unit is specifically configured to:

obtain initial planning results from the starting position to the destination position;

sort the initial planning results based on the conditions about a road including a physical isolation belt in routes of the initial planning results;

determine the route planning result according to a sorting result.

According to an embodiment of the present disclosure, the planning unit is further configured to indicate, in the route planning result, the road including the physical isolation belt in the route.

In a fourth aspect, the present disclosure provides a route planning apparatus, which includes:

a sending unit configured to send a route planning request to a server side, the request including information of a starting position and information of a destination position;

a receiving unit configured to receive a route planning result returned by the server side, the route planning result being a route from the starting position to the destination position planned by the server side based on conditions about a road including a physical isolation belt;

a displaying unit configured to display the route planning result.

According to an embodiment of the present disclosure, the displaying unit is specifically configured to display the planned route, and indicate the road including the physical isolation belt in the route.

In a fifth aspect, the present disclosure provides an electronic device, which includes:

at least one processor; and a storage communicatively connected with the at least one processor; where the storage stores instructions executable by the at least one processor, and the instructions are executed by the at least one processor to enable the at least one processor to perform the above method.

In a sixth aspect, the present disclosure provides a non-transitory computer-readable storage medium storing computer instructions therein, where the computer instructions are used to cause the computer to perform the above method.

As may be seen from the above technical solutions, the above technical solutions according to the present disclosure have the following advantages:

1) In the present disclosure, since the physical isolation belt on the road affects the user's safety during travel, the conditions about a road including a physical isolation belt are fused into the route planning, thereby improving the safety of the planned route.

2) In the present disclosure, the user may choose to include the instruction information of considering the safety factor in the route planning request to instruct to perform the route planning based on the conditions about a road including a physical isolation belt, so that the user can be enabled to flexibly select the factors considered by the route planning.

3) In the present disclosure, since the physical isolation belt exerts a special safety impact on the riding user, the riding user's safety is improved by fusing the conditions about a road including a physical isolation belt under the scenario of the riding route planning, thereby improving the riding user's safety.

4) In the present disclosure, when the route planning result is displayed, the road including the physical isolation belt can be indicated so that the user can clearly learn about which roads include the physical isolation belt so as to definitely select a route for travel.

Other effects of the above optional modes will be described hereunder in conjunction with specific embodiments.

BRIEF DESCRIPTION OF THE DRAWINGS

The figures are intended to facilitate understanding the solutions, not to limit the present disclosure. In the figures.

DETAILED DESCRIPTION

Exemplary embodiments of the present disclosure are described below with reference to the accompanying drawings, include various details of the embodiments of the present disclosure to facilitate understanding, and should be considered as merely exemplary. Therefore, those having ordinary skill in the art should recognize that various changes and modifications can be made to the embodiments described herein without departing from the scope and spirit of the application. Also, for the sake of clarity and conciseness, depictions of well-known functions and structures are omitted in the following description.

Figure 1:
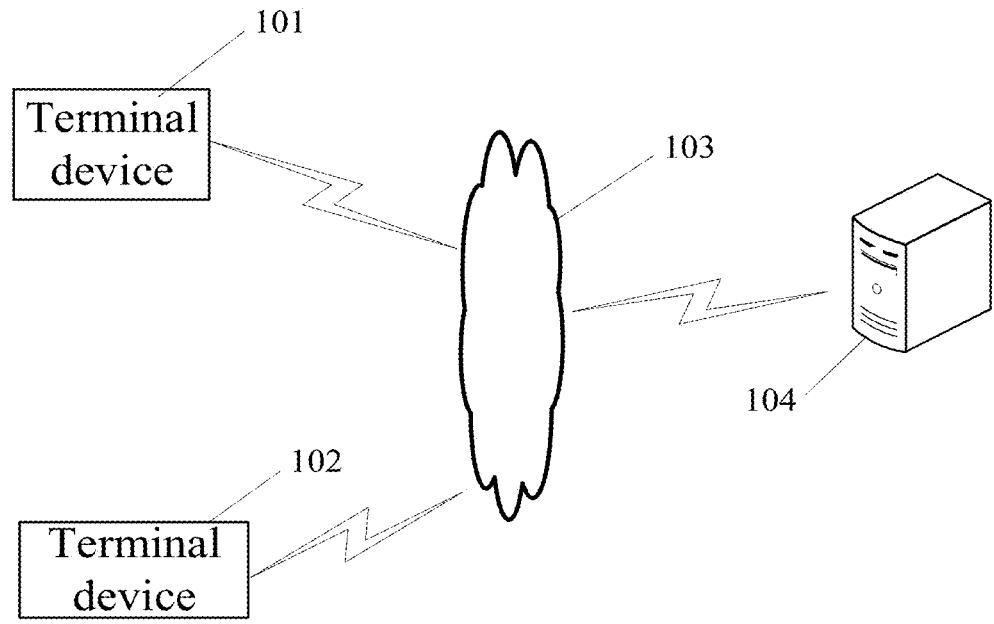
FIG. 1 illustrates a diagram of an exemplary system architecture for a route planning method or a route planning apparatus according to embodiments of the present disclosure.

FIG. 1 illustrates a diagram of an exemplary system architecture in which a route planning method or a route planning apparatus according to embodiments of the present disclosure may be applied.

As shown in FIG. 1, the system architecture may include terminal devices 101 and 102, a network 103 and a server 104. The network 103 is used to provide a medium for a communication link between the terminal devices 101, 102 and the server 104. The network 103 may include various connection types, such as wired connection, wireless communication link, or fiber optic cable, etc.

The user may interact with the server 104 via the network 103 by using the terminal devices 101 and 102. Various applications may be installed on the terminal devices 101 and 102, for example map-like applications, speech interaction applications, web browser applications, communication-like applications, and so on.

The terminal devices 101 and 102 may be various electronic devices, and include but not limited to smart phones, tablet computers, smart speakers, smart TV sets, etc. The route planning apparatus provided by the present disclosure may be disposed on and run on the above terminal device 101 or 102, or disposed on and run on the above server 104. It may be implemented as a plurality of software or software modules (for example, to provide distributed service) or as a single software or software module, which is not specifically limited herein.

For example, the terminal device 101 sends a route planning request to the server 104. The sever 104, after performing route planning, sends a route planning result to the terminal device 101. For another example, the terminal device 101, after receiving the user's route planning request, sends the route planning request to a local route planning apparatus. The local route planning apparatus, after performing offline route planning, sends a route planning result to the terminal device 101.

The server 104 may be a single server or a server group composed of a plurality of servers. It should be understood that the numbers of terminal devices, networks, and servers in FIG. 1 are only illustrative. According to the needs in implementation, there may be any number of terminal devices, networks and servers.

During travel, users usually consider the safety factor. An example for such case is that there is a pregnant woman or children in the car during the driving. For another example, for a rider, when an accident of a motor vehicle and a bicycle happens, the bicycle is usually seriously damaged and the rider is probably injured, so the rider usually needs to consider the safety of the riding route. Relevant studies show that an isolation belt for riding can substantially reduce the accident probability. A core idea of the present disclosure is fusing conditions about a rode including a physical isolation belt into route planning, thereby improving safety of the route planning. The method according to the present disclosure will be described in detail in conjunction with the embodiments.

Embodiment 1

Figure 2:
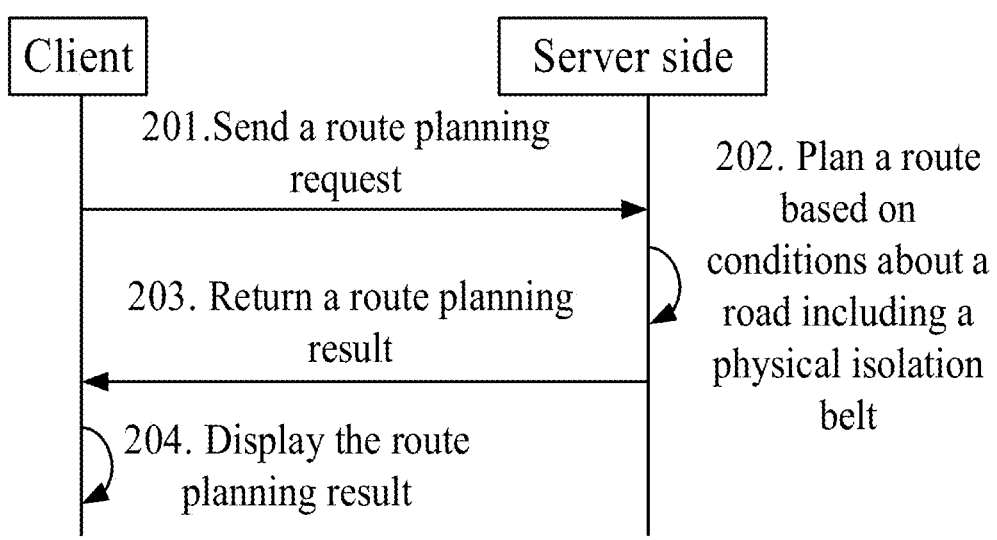
FIG. 2 illustrates a flow chart of a method according to a first embodiment of the present disclosure.

FIG. 2 illustrates a flow chart of a method according to a first embodiment of the present disclosure. The embodiment is used in an online route planning scenario. As shown in FIG. 2, the method may include the following steps:

At 201, a client sends a route planning request to a server.

The client involved in the embodiment of the present disclosure may be a client of a map-like application, a client of a navigation-like application, etc.

After being triggered by a user, the client sends the route planning request to the server. For example, the user inputs information of a starting position, information of destination position etc. on an interface provided by the client, then clicks a path planning component or navigation component, then the client sends the server the route planning request including the information of a starting position and the information of a destination position. For another example, after the user inputs a route planning instruction including the information of a starting position and the information of a destination position to the client in an audio manner, the client sends the server the route planning request including the information of the starting position and the information of the destination position.

In the embodiment of the present disclosure, step 202 may be performed for any route planning request.

As an implementation, step 202 will be performed only when the route planning request includes instruction information about considering the safety factor. When the instruction information is not included, router planning will be performed in a conventional route planning manner. For example, the user may input an option of considering the safety factor on the interface provided by the client upon inputting the information of a starting position and the information of a destination position on the interface, and the client includes the instruction information of considering the safety factor in the sent route planning request.

As an implementation, the step 202 may be performed only in the scenario of a riding route planning, i.e., judge whether the type of the route planning request is the riding route planning, and perform step 202 in response to determining that the route planning request is the riding route planning, otherwise perform the route planning in a conventional route planning manner. For example, the user inputs the information of a starting position and information of a destination position into the riding route planning interface, or after inputting the information of a starting position and information of a destination position on the interface provided by the client, the user selects a riding route planning option, and the client sends the route planning request for the riding route planning.

At 202, the server plans a route from the starting position to the destination position based on conditions about a road including a physical isolation belt.

The map data maintained by the server side includes road information. The road information may include road position information, name, length, road grade etc. In embodiments of the present disclosure, road information further includes conditions about inclusion of physical isolation belt. The isolation belt involved in the present disclosure refers to an isolation belt for isolating different lanes on a road, and may take the form of a greening belt or a guardrail. The isolation belt may be called an isolation belt, isolation rail or isolation guardrail etc.

The conditions about inclusion of physical isolation belt may include, for example, whether a physical isolation belt in included, the length of the included physical isolation belt, the type of the included physical isolation belt etc. The types of the physical isolation belt may be a physical isolation belt between lanes of motor vehicles, a physical isolation belt between a motor vehicle lane and a non-motor vehicle lane etc.

The server side may maintain the map data locally or obtain map data from map databases on other devices.

The conditions about a road including a physical isolation belt may be obtained by marking after manually collecting the map data, or obtained by big data mining. Specific manners of obtaining the conditions about a road including a physical isolation belt are not limited in the present disclosure.

The step may specifically include but not limited to the following two implementations modes:

The first implementation mode: if there are a plurality of optional roads during the route planning, a road including a physical isolation belt is preferably selected.

In this implementation mode, the conditions about a road including a physical isolation belt are used in a route planning algorithm, and if there are a plurality of optional roads from one position point to another position point during the path planning, a road including a physical isolation belt is preferably selected. If there are a plurality of roads including the physical isolation belt, a road may be selected from roads including the physical isolation belt according to other road information, or a road matching a route planning type may be selected preferably according to the type of the included physical isolation belt.

For example, during planning of a riding route from a starting position S to a destination position D, there are a plurality of optional roads from position point A to position point B, a road including the physical isolation belt is preferably selected. If there are a plurality of roads including the physical isolation belt, a road including a physical isolation belt between the motor vehicle lane and the non-motor vehicle lane is preferably selected.

The second implementation mode: obtaining initial planning results from the starting position to the destination position; sorting the initial planning results based on the conditions about a road including a physical isolation belt in routes of the initial planning results; determining a route planning result according to a sorting result.

This implementation mode does not exert an impact on the path planning algorithm, and the conditions about a road including a physical isolation belt are used in the sorting of the route planning results. In the prior art, there already exists the sorting of the route planning results based on factors such as time spent on the routes and distances of the routes. In the present disclosure, it is possible to sort the initial planning results based on conditions about a road including a physical isolation belt included by the roads, or sort the initial planning results by combining conditions about a road including a physical isolation belt with other factors.

The conditions about a road including a physical isolation belt may include the number of roads including the physical isolation belts in the routes, a total length of the roads including the physical isolation belt in the routes etc.

For example, after the initial planning results are obtained, the routes are sorted in a descending order of the number of roads including the physical isolation belt in respective routes, and top N routes are selected as a final route planning result, where N is a preset positive integer.

For another example, after the initial planning results are obtained, weighed processing (e.g., weighted summing, weighted averaging etc.) is performed according to factors such as the number of roads including the physical isolation belt in all routes, time spent on all routes and distance in the initial planning results to obtain a score of each route, the routes are sorted in a descending order of scores of all routes, and top N routes are selected as the final route planning result, where N is a preset positive integer.

In addition, when the above first implementation mode is employed, a conventional sorting manner may be employed, or a sorting manner employed by the second implementation mode may be used.

At 203, the server side sends the route planning result to the client.

When the server side sends the route planning result to the client, the roads including the physical isolation belt in the routes may be indicated in the route planning result. In another words, the route planning result may further include indication information indicating the roads including the physical isolation belt in the routes.

At 204, the client displays the route planning result.

When the client displays the route planning result, options of N routes included in the route planning result may be provided to the user for selection, wherein the route ranking the first is displayed on the map interface by default. If the user selects other routes, the route selected by the user is displayed on the map interface.

When N routes are provided for selection by the user, features of the routes may be identified, for example, "with an isolation belt", "short distance", "less time spent" etc.

In addition, to help the user to learn about the safety conditions of roads, it is possible to highlight the roads including the physical isolation belt in the routes according to the indication information about roads including the physical isolation belt in the route planning result, when the routes are displayed on the map interface. For example, the roads are displayed with specific identifiers, specific colors or specific animations.

Embodiment 2

Figure 3:
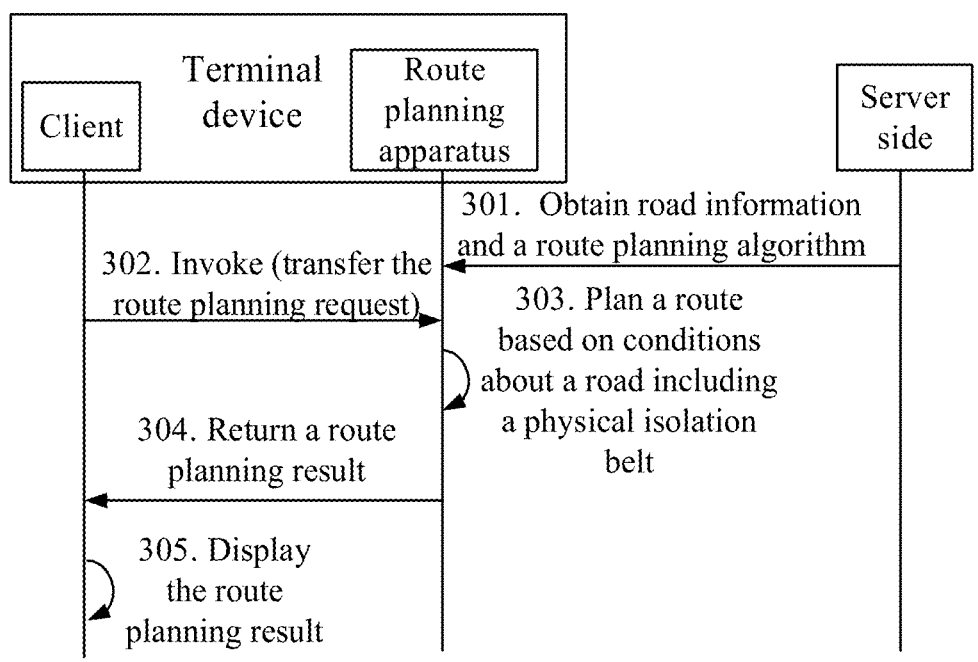
FIG. 3 illustrates a flow chart of a method according to a second embodiment of the present disclosure.

FIG. 3 illustrates a flow chart of a method according to a second embodiment of the present disclosure. The present embodiment is used for an offline route planning scenario, where the route planning apparatus and client are both disposed at the local of the terminal device, the route planning apparatus may be an application independent from the client, or a functional unit such as a plug-in or Software Development Kit (SDK) disposed in the client. As shown in FIG. 3, the method may comprise the following steps:

At 301, the route planning apparatus pre-obtains road information and a route planning algorithm from the server side.

Since what is implemented by the present embodiment is that the route planning apparatus in the terminal device performs offline route planning, the route planning apparatus needs to pre-obtain map data from the server side, the map data including road information and the route planning algorithm. The road information may include road position information, name, length, road grade etc. In embodiments of the present disclosure, road information further includes conditions about inclusion of the physical isolation belt.

The conditions about inclusion of the physical isolation belt may include for example whether the physical isolation belt is included, the length of the included physical isolation belt, the type of the included physical isolation belt etc. The types of the physical isolation belt may be a physical isolation belt between lanes of motor vehicles, a physical isolation belt between a motor vehicle lane and a non-motor vehicle lane etc.

The storage space of the terminal device is usually limited and precious, and a full amount of map data might not be obtained from the server side. Hence, the route planning apparatus may send the positioning information of the terminal device to the server side, and pre-obtain map data within a scope of the present administrative region from the server side, e.g., only obtain the map data within the scope of the present city.

At 302, after triggered by the user, the client invokes the route planning apparatus, and sends the route planning request to the route planning apparatus during the invocation.

The client involved in the present embodiment may be a client of a map-like application, a client of a navigation-like application etc. For example, the user inputs information of a starting position, information of a destination position etc. on an interface provided by the client, clicks a path planning component or navigation component, and then triggers the client to invoke the route planning apparatus, wherein during the invocation, the route planning request is transferred to the route planning apparatus as a parameter, and the route planning request includes the information of a starting position and the information of a destination position. For another example, after the user inputs a route planning instruction including the information of a starting position and information of a destination position to the client in an audio manner, the client is triggered to invoke the route planning apparatus, wherein during the invocation, the route planning request is transferred to the route planning apparatus as a parameter, Likewise, in the present embodiment, the route planning apparatus may perform step 303 for any route planning request.

As an implementation, step 303 will be performed only when the route planning request includes instruction information about considering the safety factor. When the instruction information is not included, router planning will be performed in a conventional route planning manner. For example, the user may input an option of considering the safety factor on the interface provided by the client upon inputting the information of a starting position and the information of a destination position on the interface, and the client includes the instruction information of considering the safety factor in the transferred route planning request upon invoking the route planning apparatus.

As an implementation, the step 303 may be performed only in the scenario of the riding route planning, i.e., judge whether the type of the route planning request is the riding route planning, and perform step 303 in response to determining that the type of the route planning request is the riding route planning, otherwise perform the route planning in a conventional route planning manner. For example, the user inputs the information of a starting position and information of a destination position into the riding route planning interface, or after inputting the information of a starting position and information of a destination position on the interface provided by the client, the user selects a riding route planning option, and the client transfers the route planning request for the riding route planning upon invoking the route planning apparatus.

At 303, the route planning apparatus plans a route from the starting position to the destination position based on the conditions about a road including a physical isolation belt.

In this step, reference may be made to relevant depictions of step 202 in Embodiment 1 for the path planning processing performed by the route planning apparatus, which will not be detailed here.

At 304, the route planning apparatus returns a route planning result to the client.

As in Embodiment 1, when the route planning apparatus sends the route planning result to the client, the road including the physical isolation belt in the route may be indicated in the route planning result. In another words, the route planning result may further include indication information indicative the road including the physical isolation belt in each route.

At 305, the client displays the route planning result.

The processing in the client displaying the route planning result in this step is similar to that in Embodiment 1 and will not be detailed here.

An example of a specific application scenario is listed below:

Assuming that after the user turns on the client with a map-like application being installed thereon, inputs the information of a starting position "Baidu Building" and information of a destination position "Jinyujiahua Building" on the interface provided by the client and then clicks the route planning mode "riding", the client sends the server side a route planning request, the route planning request includes the information of the starting position and the information of the destination position, and the type of the request is riding route planning.

Figure 4:
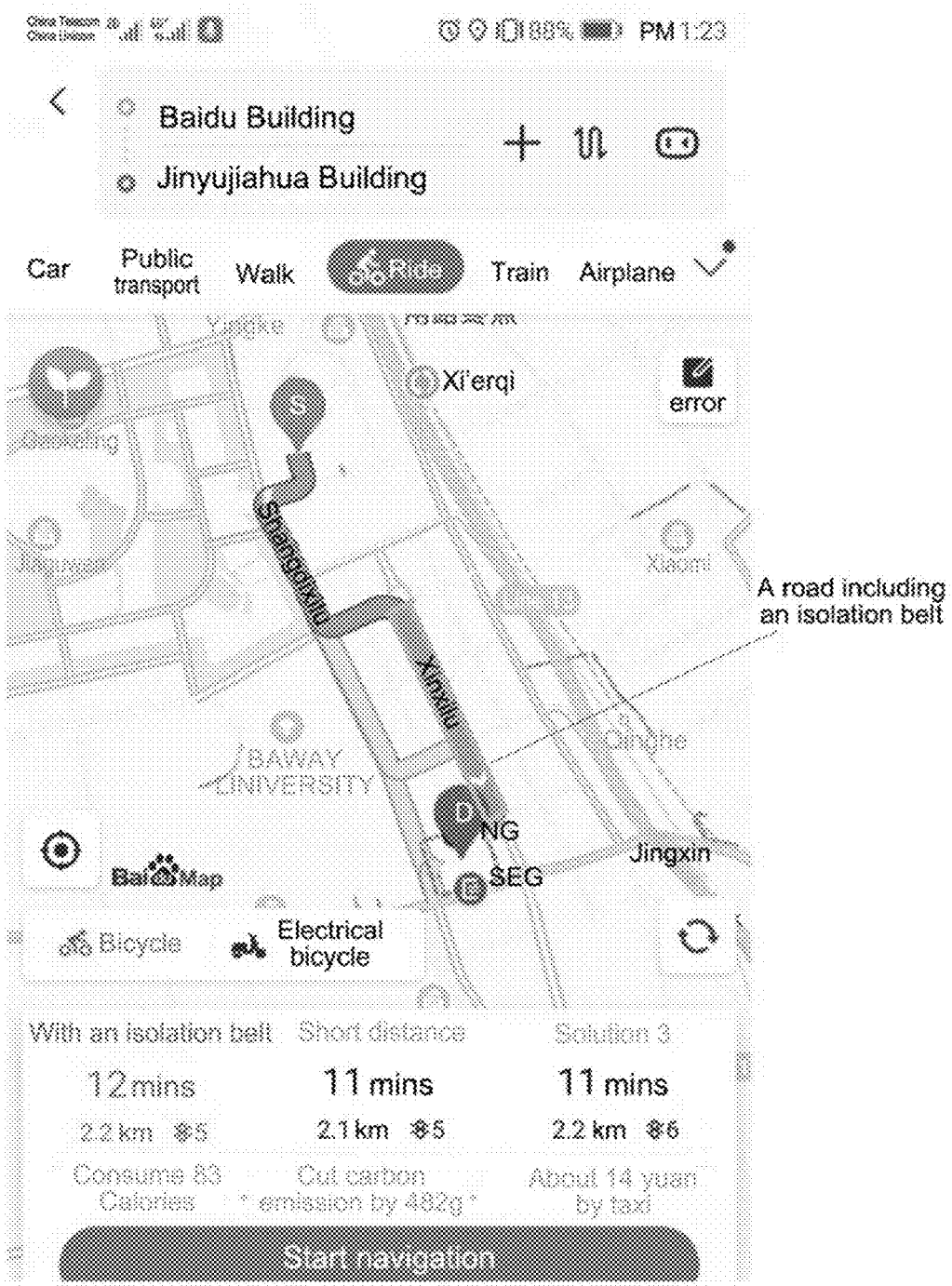
FIG. 4 illustrates a diagram of an instance of route planning in a map-like application according to an embodiment of the present disclosure.

After the server side performs route planning, the obtained route planning result is three paths (S to D). As shown in FIG. 4, the path ranking the first as a recommended route is a route having an isolation belt, and the path ranking the second is the route with the shortest distance. When the route having the isolation belt is displayed on the map interface, the road having the isolation belt in the route may be highlighted, e.g., the road may be outlined with a green edge (shown in the figure with gray).

The above describes the method according to embodiments of the present disclosure in detail. An apparatus according to embodiments of the present disclosure will be described in detail in conjunction with the embodiments.

Embodiment 3

Figure 5:
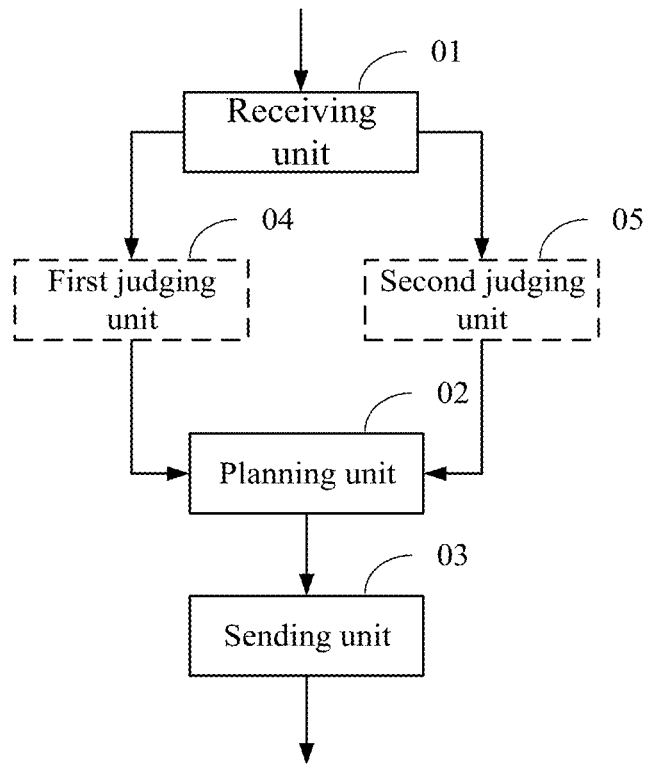
FIG. 5 illustrates a schematic structural diagram of a route planning apparatus according to a third embodiment of the present disclosure.

FIG. 5 illustrates a schematic structural diagram of a route planning apparatus according to a third embodiment of the present disclosure. The apparatus may be used to implement the processing performed at the server side in Embodiment 1, or implement the processing performed by the route planning apparatus in Embodiment 2. As shown in FIG. 5, the route planning apparatus may comprise: a receiving unit 01, a planning unit 02 and a sending unit 03, and may further comprise a first judging unit 04 or a second judging unit 05. Main functions of the units are as follows:

The receiving unit 01 is configured to receive a route planning request, and the request includes information of a starting position and information of a destination position. If the route planning apparatus is located at a server side, the route planning request is sent by a client through a network. If the route planning apparatus is located at a terminal device side, the route planning request is transferred as a parameter when the client invokes the route planning apparatus.

The planning unit 02 is configured to plan a route from the starting position to the destination position based on conditions about a road including a physical isolation belt.

The sending unit 03 is configured to send a route planning result.

As an implementation mode, the first judging unit 04 may judge whether the route planning request includes instruction information of considering a safety factor, and in response to determining that the route planning request includes instruction information of considering a safety factor, instruct the planning unit 02 to plan a route from the starting position to the destination position based on whether the road includes the physical isolation belt; otherwise, the planning unit 02 may perform a conventional path planning manner.

As another implementation mode, the second judging unit 05 may judge whether a type of the route planning request is riding route planning, and in response to determining that the type of the route planning request is riding route planning, instruct the planning unit 02 to plan a route from the starting position to the destination position based on whether the road includes the physical isolation belt; otherwise, the planning unit 02 may perform a conventional path planning manner.

Specifically, the planning unit 02 may employ but not limited to the following two implementation modes:

The first implementation mode: if there are a plurality of optional roads during the route planning, the planning unit preferably selects a road including a physical isolation belt.

In this implementation mode, the conditions about a road including a physical isolation belt are used in a route planning algorithm, and if there are a plurality of optional roads from one position point to another position point during the path planning, a road including a physical isolation belt is preferably selected. If there are a plurality of roads including the physical isolation belt, a road may be selected from roads including the physical isolation belt according to other road information, or a road matching a route planning type may be selected preferably according to the type of the included physical isolation belt.

The second implementation mode: the planning unit 02 obtains initial planning results from the starting position to the destination position; sorts the initial planning results based on the conditions about a road including a physical isolation belt in routes of the initial planning results; determines a route planning result according to a sorting result.

This implementation mode does not exert an impact on the path planning algorithm, and the conditions about a road including a physical isolation belt are used in the sorting of the route planning results. In the prior art, there already exists the sorting of the route planning results based on factors such as time spent on the routes and distances of the routes. In the present disclosure, it is possible to sort the initial planning results based on conditions about a road including a physical isolation belt, or sort the initial planning results by combining conditions about a road including a physical isolation belt with other factors.

The conditions about a road including a physical isolation belt may include the number of roads including the physical isolation belt in the route, a total length of the roads including the physical isolation belt, etc.

Furthermore, the planning unit 02 is further configured to indicate the road including the physical isolation belt in the route in the route planning result. In other words, the route planning result may further comprise indication information indicative of the road including the physical isolation belt in each route.

Embodiment 4

Figure 6:
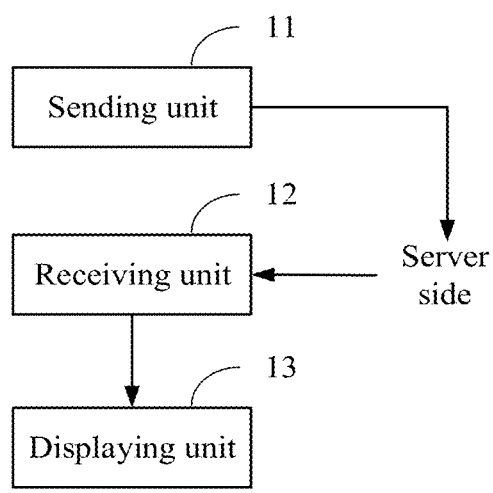
FIG. 6 illustrates a schematic structural diagram of a route planning apparatus according to a fourth embodiment of the present disclosure.

FIG. 6 illustrates a schematic structural diagram of a route planning apparatus according to a fourth embodiment of the present disclosure. The apparatus may be used to implement the processing performed by a client in Embodiment 1. As shown in FIG. 6, the route planning apparatus may comprise: a sending unit 11, a receiving unit 12 and a displaying unit 13. Main functions of the units are as follows:

The sending unit 11 is configured to send a route planning request to a server side, the request comprising information of a starting position and information of a destination position.

Furthermore, the route planning request sent by the sending unit 11 further comprises instruction information of considering a safety factor. Alternatively, a type of the route planning request is a riding route planning.

The receiving unit 12 is configured to receive a route planning result returned by the server side, the route planning result being a route from the starting position to the destination position planned by the server side based on the conditions about a road including a physical isolation belt.

The displaying unit 13 is configured to display the route planning result. When the route planning result is displayed, options of N routes included in the route planning result may be provided to the user for selection, where the route ranking the first is displayed on the map interface by default. If the user selects another route, the route selected by the user is displayed on the map interface.

Preferably, the displaying unit 13, upon displaying the planned route, may indicate the road including the physical isolation belt in the route, e.g., the road is displayed with a specific identifier, a specific color or a specific animation.

According to embodiments of the present disclosure, the present disclosure further provides an electronic device and a readable storage medium.

Figure 7:
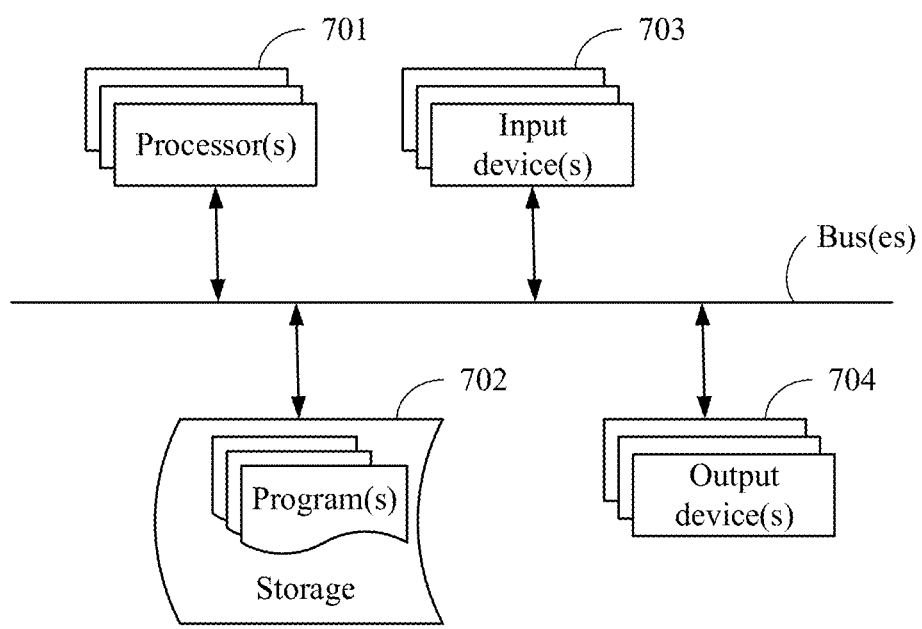
FIG. 7 illustrates a block diagram of an electronic device for implementing a route planning method according to an embodiment of the present disclosure.

As shown in FIG. 7, it shows a block diagram of an electronic device for implementing the route planning method according to embodiments of the present disclosure. The electronic device is intended to represent various forms of digital computers, such as laptops, desktops, workstations, personal digital assistants, servers, blade servers, mainframes, and other appropriate computers. The electronic device is further intended to represent various forms of mobile devices, such as personal digital assistants, cellular telephones, smart phones, wearable devices and other similar computing devices. The components shown here, their connections and relationships, and their functions, are meant to be exemplary only, and are not meant to limit implementations of the inventions described and/or claimed in the text here.

As shown in FIG. 7, the electronic device comprises: one or more processors 701, a storage 702, and interfaces connected to components and including a high-speed interface and a low speed interface. Each of the components are interconnected using various busses, and may be mounted on a common motherboard or in other manners as appropriate. The processor can process instructions for execution within the electronic device, including instructions stored in the memory or on the storage device to display graphical information for a GUI on an external input/output device, such as display coupled to the interface. In other implementations, multiple processors and/or multiple buses may be used, as appropriate, along with multiple storages or memories. Also, multiple electronic devices may be connected, with each device providing portions of the necessary operations (e.g., as a server bank, a group of blade servers, or a multi-processor system). One processor 701 is taken as an example in FIG. 7.

The storage 702 is a non-transitory computer-readable storage medium provided by the present disclosure. Wherein, the storage stores instructions executable by at least one processor, so that the at least one processor executes the route planning method according to the present disclosure. The non-transitory computer-readable storage medium of the present disclosure stores computer instructions, which are used to cause a computer to execute the route planning method provided by the present disclosure.

The storage 702 is a non-transitory computer-readable storage medium and can be used to store non-transitory software programs, non-transitory computer executable programs and modules, such as program instructions/modules corresponding to the route planning method in the embodiments of the present disclosure. The processor 701 executes various functional applications and data processing of the server, i.e., implements the route planning method in the above method embodiments, by running the non-transitory software programs, instructions and modules stored in the storage 702.

The storage 702 may include a storage program region and a storage data region, wherein the storage program region may store an operating system and an application program needed by at least one function; the storage data region may store data created according to the use of the electronic device for implementing the route planning method according to the embodiments of the present disclosure. In addition, the storage 702 may include a high-speed random access memory, and may also include a non-transitory memory, such as at least one magnetic disk storage device, a flash memory device, or other non-transitory solid-state storage device. In some embodiments, the storage 702 may optionally include a memory remotely arranged relative to the processor 701, and these remote memories may be connected to the electronic device for implementing the method of generating the speech packet according to embodiments of the present disclosure through a network. Examples of the above network include, but are not limited to, the Internet, an intranet, a local area network, a mobile communication network, and combinations thereof.

The electronic device or implementing the method of generating the speech packet may further include an input device 703 and an output device 704. The processor 701, the storage 702, the input device 703 and the output device 704 may be connected through a bus or in other manners. In FIG. 7, the connection through the bus is taken as an example.

The input device 703 may receive inputted numeric or character information and generate key signal inputs related to user settings and function control of the electronic device for implementing the method of generating the speech packet, and may be an input device such as a touch screen, keypad, mouse, trackpad, touchpad, pointing stick, one or more mouse buttons, trackball and joystick. The output device 704 may include a display device, an auxiliary lighting device (e.g., an LED), a haptic feedback device (for example, a vibration motor), etc. The display device may include but not limited to a Liquid Crystal Display (LCD), a Light Emitting Diode (LED) display, and a plasma display. In some embodiments, the display device may be a touch screen.

Various implementations of the systems and techniques described here may be realized in digital electronic circuitry, integrated circuitry, specially designed ASICs (Application Specific Integrated Circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to send data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

It should be understood that the various forms of processes shown above can be used to reorder, add, or delete steps. For example, the steps described in the present disclosure can be performed in parallel, sequentially, or in different orders as long as the desired results of the technical solutions disclosed in the present disclosure can be achieved, which is not limited herein.

The foregoing specific implementations do not constitute a limitation on the protection scope of the present disclosure. It should be understood by those skilled in the art that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A route planning method, comprising:
receiving a route planning request including information of a starting position and information of a destination position;
planning a route from the starting position to the destination position based on conditions about a road including a physical isolation belt in response to determining that the route planning request further includes instruction information of considering a safety factor or a type of the route planning request is a riding route planning, and during the planning, selecting the road including the physical isolation belt in a case that there are a plurality of optional roads; and
sending a route planning result, and indicating, in the route planning result, the road including the physical isolation belt in the route.

2. The method according to claim 1, wherein the planning the route from the starting position to the destination position based on conditions about the road including the physical isolation belt comprises:
obtaining initial planning results from the starting position to the destination position;

sorting the initial planning results based on the conditions about the road including the physical isolation belt in routes of the initial planning results; and determining the route planning result according to a sorting result.

3. The method according to claim 2, wherein the conditions about the road including the physical isolation belt in the routes comprise:

the number of roads including physical isolation belts in the routes, or a total length of the road including the physical isolation belt in the routes.

4. An electronic device, comprising:

at least one processor; and a storage communicatively connected with the at least one processor; wherein, the storage stores instructions executable by the at least one processor, and the instructions are executed by the at least one processor to enable the at least one processor to perform the route planning method of claim 1.

5. The electronic device according to claim 4, wherein the planning the route from the starting position to the destination position based on conditions about the road including the physical isolation belt comprises:

obtaining initial planning results from the starting position to the destination position;

sorting the initial planning results based on the conditions about the road including the physical isolation belt in routes of the initial planning results; and determining the route planning result according to a sorting result.

6. The electronic device according to claim 5, wherein the conditions about the road including the physical isolation belt in the routes comprise:

the number of roads including physical isolation belts in the routes, or a total length of the road including the physical isolation belt in the routes.

7. A non-transitory computer-readable storage medium storing computer instructions therein, wherein the computer instructions are used to cause a computer to perform the route planning method of claim 1.

8. The method according to claim 1, wherein the route planning request is a riding route planning, and selecting the road including the physical isolation belt comprising selecting a road including a physical isolation belt between a motor vehicle lane and a non-motor vehicle lane.

9. A route planning method, comprising:

sending a route planning request to a server side, the request including information of a starting position and information of a destination position, wherein the route planning request further includes instruction information of considering a safety factor, or a type of the route planning request is a riding route planning;

receiving a route planning result returned by the server side, the route planning result comprising a route from the starting position to the destination position planned by the server side based on conditions about a road including a physical isolation belt, and wherein the road including the physical isolation belt is selected in a case that there are a plurality of optional roads; and displaying the route planning result, and indicating, in the route planning result, the road including the physical isolation belt in the route.

10. An electronic device, comprising:

at least one processor; and a storage communicatively connected with the at least one processor; wherein, the storage stores instructions executable by the at least one processor, and the instructions are executed by the at least one processor to enable the at least one processor to perform the route planning method of claim 9.

11. A non-transitory computer-readable storage medium storing computer instructions therein, wherein the computer instructions are used to cause a computer to perform the route planning method of claim 9.

* * * * *